May 2, 1961

W. MEFFERT 2,982,534

ROTARY FURNACE APPARATUS

Filed Feb. 11, 1959

INVENTOR.
Walter Meffert
BY Fred Wiviott
Attorney

May 2, 1961  W. MEFFERT  2,982,534
ROTARY FURNACE APPARATUS
Filed Feb. 11, 1959 2 Sheets-Sheet 2

INVENTOR.
Walter Meffert
BY Fred Wiviott
Attorney

United States Patent Office 2,982,534
Patented May 2, 1961

2,982,534
ROTARY FURNACE APPARATUS

Walter Meffert, Duisburg, Germany, assignor to Demag-Elektrometallurgie G.m.b.H., Duisburg, Germany, a corporation of Germany Filed Feb. 11, 1959, Ser. No. 792,535
Claims priority, application Germany Feb. 26, 1958
7 Claims. (Cl. 266—38)

This invention relates to a rotary furnace apparatus and particularly to an electric reduction furnace and means to selectively withdraw portions of the furnace charge while maintaining rotation of the furnace.

Metallurgical furnaces employing electrical heating elements to reduce a charge to a molten state may be slowly rotated about a vertical axis to continuously distribute the charge and thoroughly mix the alloying metals, slag, and the like. The rotation of the furnace creates a more even heating of the charge and prevents high volatilization losses accompanying localized heating of a charge and thus establishes a more efficient heating process.

In pig iron and ferromanganese reduction furnaces and the like, preselected quantities of the slag and molten metallic charge are successively withdrawn during a continuing reduction process. The charge removal is preferably done without de-energizing the heating elements of the furnace or discontinuing the rotation of the furnace.

In conventional apparatus, a tap spout is provided adjacent the base area of the furnace to selectively discharge a portion of the charge into a suitable straight refractory channel-shaped tapping gutter or conduit which is suitably supported adjacent the furnace. The withdrawn charge is directed by the conduit into a suitable container or receiving means which is aligned with the opposite end of the conduit.

The tapping conduit is disposed immediately adjacent the spout to prevent destruction of the conduit walls by the falling molten charge.

In order to allow continuous rotation of the furnace, an arcuate channel-shaped conduit is mounted encircling the furnace and connected to the tapping conduit. The arcuate conduit extends coextensively with at least a portion of the arcuate path of the spout to maintain communication of the tapped material with the tapping conduit.

Although the arcuate conduit allows continuous rotation of the furnace, the flow path for the molten charge is substantially increased and objectionable and detrimental cooling of the charge results. The metal discharging from the spout also tends to strike directly the side walls of the arcuate conduit and form depressions in the side wall. Frequent maintenance and replacement of the arcuate conduit results. Further, the molten charge may splash over the side walls of the arcuate conduit and greatly endanger the furnace attendants.

The present invention provides a movable conduit which is interlocked with the rotating furnace to establish simultaneous movement for preselected angular movement of the furnace. Consequently, a single minimum length conduit is maintained in alignment with the discharge opening or spout in the furnace. Further, the molten material is discharged on the tapping conduit in the direction of subsequent flow and does not strike the sidewalls.

In accordance with the present invention, a tapping conduit is movably mounted generally radially of the furnace for movement in a path which substantially maintains the relative positions of the conduit and furnace. The conduit is selectively and releasably coupled to the furnace through a suitable interlock to maintain a preselected period of simultaneous movement. The interlock is maintained for a sufficient duration to permit tapping of the desired quantity of material.

In accordance with one aspect of the present invention, the interlock is established by a pair of mechanical coupling members which are adapted for releasable engagement. The coupling members are carried respectively, one each, by the furnace and the tapping conduit. The tapping conduit member is disposed in the path of the furnace coupling member. Therefore, as the furnace rotates, the furnace coupling member approaches and engages the tapping conduit coupling member ot establish simultaneous movement of the furnace and tapping conduit. The path of the tapping conduit is provided with a terminal path which moves the tapping conduit in a direction to automatically decouple the tapping conduit coupling member and thereby establish independent movement of the furnace and conduit. The tapping conduit is subsequently returned to the starting position to again dispose the conduit coupling member in the path of the furnace coupling member for a subsequent tapping operation.

In accordance with another aspect of the invention, the tapping conduit is movably mounted for rectilinear movement tangentially of the rotating furnace. The coupling or interlock means comprises a pin and a peripherally slotted member secured, one each, to the furnace and to the conduit. As the furnace rotates, the pin moves into the peripheral slot of the opposite coupling member and locks the furnace and conduit together. The interlock is maintained until such time as the rectilinear motion of the tapping conduit and the relatively lateral movement of the furnace coupling member, caused by rotation of the furnace, separates the pin from the peripherally slotted member.

The latter construction establishes a simple and rugged interlock apparatus which is relatively inexpensive and which requires a minimum of maintenance. The interlock apparatus and conduit movement is readily adapted to existing rotating furnaces and the like.

The drawings furnished herewith illustrate the best mode presently contemplated for carrying out the invention.

Figure 1:
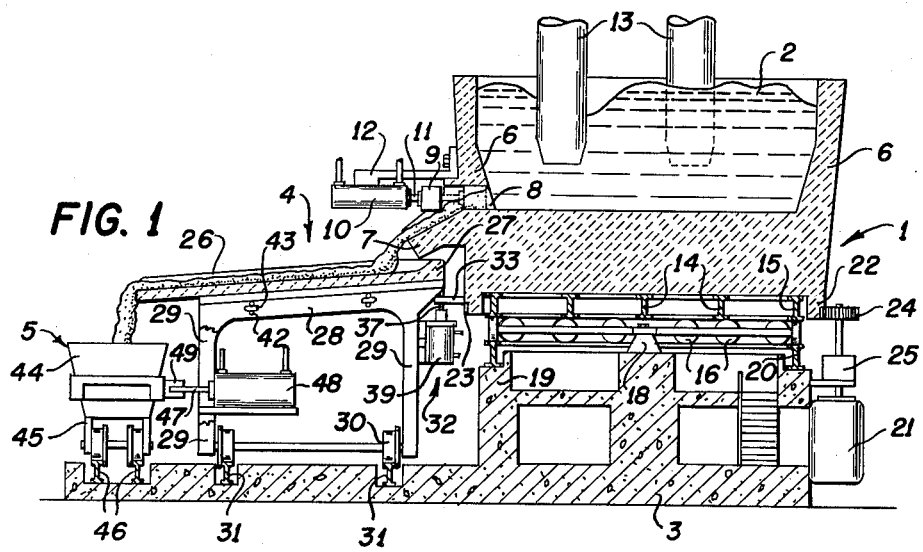
Figure 1 is a view taken on a vertical section through a reduction furnace apparatus constructed in accordance with the present invention.
Figure 2:
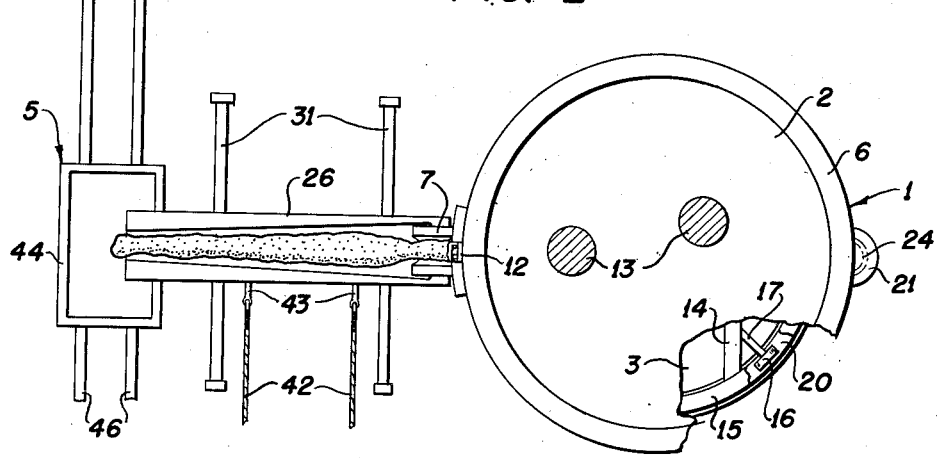
Figure 2 is a plan view of the structure shown in Figure 1, with parts broken away to show the furnace support.

Referring to the drawing and particularly Figs. 1 and 2, the illustrated embodiment of the invention generally includes a cup-shaped furnace 1 which contains a molten charge 2. The cup-shaped furnace 1 is rotatably supported on a base 3 and is continually rotated about the vertical axis to thoroughly mix the molten charge 2. A charge tapping assembly 4 is movably mounted adjacent the furnace 1 and is adapted to receive and transport a portion of the molten charge 2 to a suitable ladle truck 5.

The cup-shaped furnace 1 is formed of a suitable refractory material which is rammed to define an open-topped chamber 6 within which the molten charge 2 is supported. A channel-shaped spout 7 is integrally formed on the side wall of the furnace 1 and extends radially outwardly and downwardly toward the tapping assembly 4. An opening 8 is provided in the side wall of the furnace 1 immediately adjacent the bottom of chamber 6 and connects the chamber 6 to the spout 7. A closure 9 is disposed within the opening 8 to seal the furnace chamber 6 against leakage. A remotely controlled pneumatic motor 10 includes a movable piston, not shown, which is connected to the closure by a piston rod 11 to permit selective opening and closing of the opening 8. A bracket 12 is secured to motor 10 and to the furnace chamber 6 to support the motor 10. The motor 10 is remotely controlled in any suitable manner, not shown, to horizontally position the piston rod 11 and the attached closure 9.

A pair of vertically disposed electrodes 13 is suitably mounted above the furnace 1 and extend downwardly into the charge 2. The electrodes 13 are connected to a suitable source of current, not shown, to establish conventional heating of the charge.

A lower platform 14 formed of a plurality of interconnected I-beams is secured to the bottom of the refractory chamber 6. The platform 14 includes an outer ring-shaped I beam 15 which rests upon a series of circumferentially distributed wheels 16 to rotatably support the furnace 1. A spoke 17 for each wheel 16 is secured to a central pivot member 18 and extends radially outwardly of the furnace 1 to the distributed wheels 16. The wheels 16 are journaled on the terminal end of spokes 17 and move in a circle about the central pivot 18.

The base 3 is a framework of concrete walls and includes an annular top portion 19. A ring-shaped I beam 20 is secured to the top wall portion 19 and constitutes a track for the wheels 16 to rotatably support the furnace 1 upon the base 3.

The furnace 1 is continuously rotated in a horizontal plane about the pivot member 18 by a motor 21 as follows.

A depending annular apron 22 is integrally formed on bottom edge of the furnace chamber 6 encircling the supporting platform 14.

A ring gear 23 is secured to the outer circumference of the furnace apron 22 and meshes with a driven gear 24. A suitable gear train 25 connects the gear 24 to the motor 21 to slowly rotate the furnace 1 about the vertical axis through the furnace. The discharge spout 7 of furnace 1 thus passes over the position of the charge tapping assembly 4 once per revolution of the furnace.

The charge tapping assembly 4 includes an open channel-shaped gutter or conduit 26 of suitable rammed refractory material. The input end of conduit 26 is disposed immediately beneath the spout 7 and the conduit extends radially outwardly of the furnace 1 therefrom. Consequently, the flow of a tapped molten charge incident to removal of closure 9 is in line with the conduit 26 and is onto the bottom of the conduit. The molten metal does not strike the conduit walls. An end wall 27 is formed on the input end of the conduit 26 and prevents backward discharge of molten metal.

The conduit 26 is secured to the top of a platform 28 which extends vertically downwardly from the furnace to establish gravity flow of the charge through the conduit. The platform 28 includes a plurality of table legs 29 having railway type wheels 30 secured to their lower ends to movably support the conduit 26. Rectilinear I-beam tracks 31 are formed in the base 3 in accordance with the spacing of wheels 30 and extend generally tangentially of a circle having the pivot member 18 as a center to establish corresponding movement of the conduit 26.

The tapping assembly 4 is selectively interlocked or coupled to the furnace 1 by a releasable mechanical coupling 32 to establish simultaneous movement of the furnace 1 and the tapping assembly 4 for a preselected portion of the angular movement of the furnace once each revolution of furnace 1.

Figure 3:
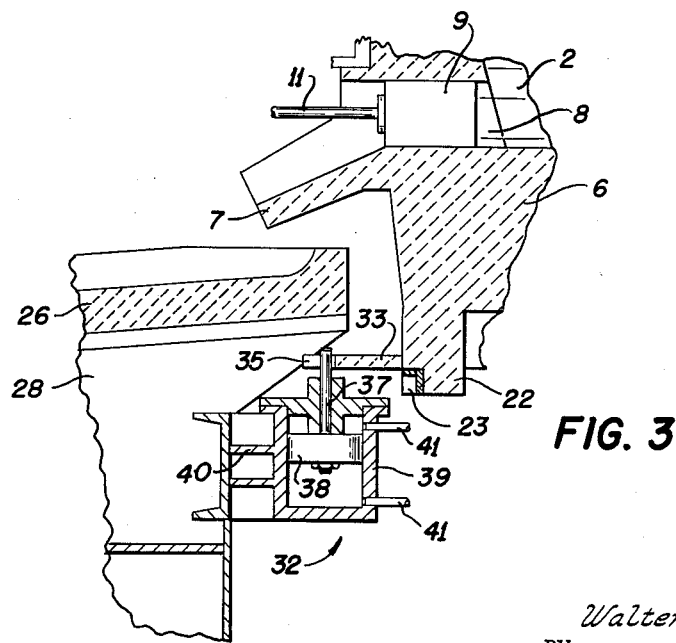
Figure 3 is an enlarged fragmentary view of the coupling components shown in Figs. 1 and 2.
Figure 4:
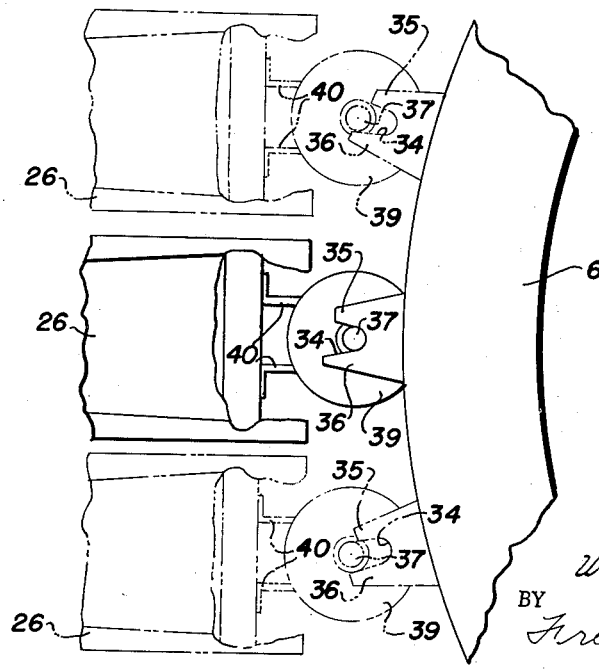
Figure 4 is an enlarged fragmentary view showing various positions of the coupling components.

Referring particularly to Figures 3 and 4, the furnace member of the coupling 32 includes a horizontal plate 33 which is secured to the periphery of the furnace apron 22 in vertical alignment with the spout 7. A U-shaped recess 34 is defined by a radially extending leading arm 35 and trailing arm 36 of plate 33. The leading arm 35 of the plate 33 is somewhat shorter than the trailing arm 36.

The tapping assembly portion of the coupling 32 includes a pin 37 which is rigidly secured to the platform 28 of the tapping assembly 4, as more fully described hereinafter. With the tapping assembly 4 in an initial starting position, the pin 32 is in the path of the extended portion of the coupling arm 36 of coupling plate 33 but is outwardly of the path of the short coupling arm 35. Consequently, as the furnace rotates and the spout 7 comes into alignment with conduit 26, the short arm 35 moves past pin 37. However, the arm 36 engages pin 37 which moves into slot 34, as shown in Figure 4, and establishes synchronous angular movement of the furnace 1 and rectilinear movement of the tapping assembly 4 and the attached coupling pin 37 in a line tangent to the circular path of the plate 33.

The coupling pin 37 is attached to the platform 28, in the illustrated embodiment of the invention, for vertical movement out of the path of the coupling arm 36 to allow independent movement of the furnace and the tapping assembly 4.

Referring particularly to Figure 3, the pin 37 is secured to a piston 38 which is slidably journaled within a cylinder 39 an axis coinciding with the axis of pin 37. Suitable channel brackets 40 rigidly connect the cylinder 39 to the conduit platform 28. A pair of control lines 41 are connected to the cylinder 39 on opposite sides of the piston 39 and are selectively connected to a power fluid source, not shown, to admit and withdraw the actuating fluid with respect to the opposite faces of the piston 33 and to thereby correspondingly position the pin 37.

Suitable cables 42 are secured to the platform 28 as by eyebolt connectors 43 and to a winch or other suitable drive means, not shown, to position the tapping assembly 4 in the starting position, shown in phantom in the lower portion of Figure 4. During a tapping operation, cables 42 extend with the tapping assembly 4 to allow simultaneous movement of the furnace 1 and assembly 4.

The tapping conduit 26 directs the withdrawn charge to the ladle truck 5 during the simultaneous movement.

The truck 5 includes an open-topped container 44 having a four-wheeled undercarriage 45 to allow movement of the truck 5 with the tapping assembly 4. Tracks 46 for the truck 5 are constructed parallel to tracks 31 for the tapping assembly 4. The truck 5 is located in the starting position with the open-topped container 44 immediately beneath the terminal end of the conduit 26.

The tapping assembly 4 is selectively coupled to the truck 5 by a horizontal arm 47 which is movably secured to the assembly 4. The arm 47 is the piston rod portion of a conventional pneumatic motor 48 which is attached to the legs 29 of platform 28. In the extended horizontal position, the arm 47 engages a laterally extending stop 49 on the truck 5 and establishes simultaneous movement of the conduit 26 and the open-topped container 44. In the retracted horizontal position, the arm 47 lies inwardly of the path of the truck 5 to allow positioning of a truck 5 beneath the conduit 26.

The operation of the illustrated embodiment of the invention is summarized as follows:

The charge 2 is disposed within the furnace 1 and the electrodes 13 are suitably energized to reduce the charge to a molten state. Simultaneously, the motor 21 is energized to rotate the furnace 1 and establish complete mixing of the charge 2. When a portion of the charge 2 is to be removed, the fluid lines to the coupling cylinder 39 are connected to the incoming fluid source, not shown, to raise the piston 38 and the attached pin 37 into operating position. If the conduit assembly 4 is not in the initial starting position, the cables 42 are actuated to position or place the assembly in the starting position. Similarly, a ladle truck 5 is positioned with the open-topped container 44 in alignment with the discharge end of the conduit 26 and the arm 47 is moved to the extended horizontal position.

As the furnace 1 rotates, the radial plate 33 of coupling 32 approaches the coupling pin 37. The longer arm 36 which defines the U-shaped slot 34 engages the pin 37. The continued rotation of furnace 1 moves the pin 37 into slot 34 and couples the furnace 1 to the tapping assembly 4 establishing simultaneous movement of the furnace spout 7 and the tapping conduit 26.

The closure control 10 for opening 9 is automatically or manually actuated to remove the closure 9 and allow free flow of material through opening 8 generally in synchronism with the completion of the coupling. The spout 7 directs the tapped charge on to the input end of the tapping conduit 26. The coupling 32 maintains the alignment of the spout 7 and the input end of the conduit 26 during a preselected period.

The molten charge is allowed to flow through the opening 8 until a preselected quantity has been delivered to the ladle truck 5. The closure is then returned to the closed position within opening 8 to seal the furnace 1 until another tapping operation.

As the furnace 1 continues to rotate, the rectilinear movement of the tapping assembly 4 and the rotary movement of the furnace 1 causes the coupling plate 33 to move laterally of the coupling pin 37, as shown in phantom in the upper portion of Figure 4. The simultaneous movement of assembly 4 and furnace 1 is maintained until the platform 28 and pin 37 of the tapping assembly 4 moves to the opposite side of the tangency point with the path of the coupling plate 33 by an amount corresponding to the initial starting offset. In the illustrated embodiment of the invention, this is approximately 30 degrees. Because of the relatively slow angular speed of the furnace 1, the coincident movement period is sufficient to allow withdrawal of typical quantities of the molten charge.

The pin 37 thus automatically disengages the slotted plate 33 incident to continued movement of the furnace 1 and the tapping assembly 4 stops as the furnace continues to rotate.

The tapping assembly 4 is subsequently returned to the initial starting position by suitable actuation of the cables 42. The piston arm 47 is moved to the retracted position to allow positioning of a ladle truck 5 for a subsequent charge tapping cycle.

The illustrated embodiment of the invention provides an automatic release of the coupling means and eliminates the danger of malfunctioning of the coupling unit.

A plurality of tap spouts and conduit units can be employed in connection with the present invention. A single tapping conduit unit and tap spout is illustrated for purposes of simplicity and clarity. Further, the tapping assembly may move in a generally arcuate path with other suitable interlocking of the furnace and assembly establishing the desired synchronous movement.

The present invention provides an efficient and accurate tapping structure for reduction furnaces and the like which are continuously rotated. The coupling is rugged and simple and is thus adapted for shop use.

Various modes of carrying out the invention are contemplated as being within the scope of the following claims particularly pointing out and distinctly claiming the subject matter which is regarded as the invention.

I claim:

1. In a rotary electric furnace having a treating chamber and a discharge means, a movable conduit means adapted to direct discharging metal from said discharge means to a receiving means, power means to drive the furnace and the conduit means, and interlocking means selectively coupling the power means to continuously rotate the furnace and to simultaneously drive the conduit means for a preselected angular movement of the furnace to maintain predetermined alignment of at least the immediately adjacent portions of the discharge means and the conduit means.

2. In a rotary electric furnace having a treating chamber and a discharge means, a movable conduit means adapted to direct discharging material from said discharge means to a receiving means, and releasable coupling means having a first coupling member on the rotary furnace for rotation therewith and a second coupling member on said conduit means to selectively transmit the motion of said rotary furnace to said conduit means.

3. In a rotary electric furnace having a treating chamber and a discharge spout, a straight conduit movably mounted adjacent the furnace to direct discharging material from said spout to a receiving means, power means to drive the furnace and the conduit, interlocking means selectively coupling the power means to continuously rotate the furnace and to simultaneously drive the furnace and the conduit for a preselected angular movement of the furnace, and means to restrict the movement of the conduit to maintain predetermined alignment of at least the immediately adjacent portions of the discharge spout and the discharge conduit.

4. In a rotary electric furnace having a treating chamber and a discharge spout, a movable channel-shaped conduit adapted to direct discharging material from said spout to a receiving means, power means to drive the furnace and the conduit, interlocking means selectively coupling the power means to the furnace to continuously rotate the furnace and to simultaneously drive the furnace and the conduit for a preselected angular movement of the furnace to maintain predetermined alignment of at least the immediately adjacent portions of the discharge spout and the discharge conduit, a container movably mounted adjacent the discharge portion of the discharge conduit to receive the tapped molten metal, and interlocking power means to establish simultaneous movement of the container and the conduit during a tapping period, and releasing means to allow independent return of the conduit to the initial starting position relative to said furnace and container.

5. In a rotary electric furnace having a treating chamber and a generally radial discharge spout, means for rotating the furnace, a straight conduit positioned in longitudinal alignment with the spout and extending outwardly and downwardly therefrom, a straight track extending generally tangentially of a circle defined by the rotating furnace, a movable platform supporting said conduit on said straight track, a coupling unit having a horizontal arm secured to the furnace and a vertical pin secured to the movable platform, a pneumatic motor having a piston secured to said pin for selective positioning said pin relative to said horizontal arm to alternately dispose the pin in the path of the arm for completion of the coupling and to remove the pin from the path of the arm to open said coupling, a container movably mounted adjacent the outer end of conduit to receive the tapped molten metal, a straight track for the container paralleling said first named straight track, and interlocking means to establish simultaneous movement of the container and the conduit during a tapping period.

6. In a rotary electric furnace having a treating chamber and a discharge spout, a movable discharge conduit adapted to direct discharging metal from said spout to a receiving means, a coupling unit having a horizontal plate member with a U-shaped opening defined by a leading arm and a trailing arm and having a pin adapted to be disposed within said U-shaped opening, said plate member and said pin being secured to the furnace and the discharge conduit respectively to establish engaging alignment of the opening and the pin with the leading arm moving past the pin to allow engagement with the opposite arm, and means to establish rectilinear movement of the conduit on a line spaced from the axis of the rotating furnace whereby said coupling unit automatically engages and disengages incident to preselected angular positions of the rotating furnace.

7. In a rotary electric furnace having a treating chamber and a discharge spout, a movable discharge conduit adapted to direct discharging metal from said spout to a receiving means, a coupling unit having a first member with a U-shaped opening and having a pin adapted to be disposed within said U-shaped opening, said first member and said pin being secured to the furnace and the discharge conduit, said pin constituting an extension of a piston journaled within a cylinder, fluid control means to position the piston and said pin to condition said coupling unit, and means to establish rectilinear movement of the conduit relative to the rotating furnace whereby said coupling unit automatically engages and disengages incident to a preselected angular positioning of the rotating furnace and conditioning of said fluid means.

References Cited in the file of this patent

UNITED STATES PATENTS

| | | |
|---|---|---|
| 1,314,691 | Netter | Sept. 2, 1919 |
| 1,610,883 | Ripley | Dec. 14, 1926 |
| 2,522,031 | Gavin | Sept. 12, 1950 |
| 2,743,491 | Berry | May 1, 1956 |